United States Patent
Pakulak et al.

(10) Patent No.: US 9,139,125 B2
(45) Date of Patent: Sep. 22, 2015

(54) COUPLING ASSEMBLY

(71) Applicant: GM GLOBAL TECHNOLOGY OPERATIONS LLC, Detroit, MI (US)

(72) Inventors: Michael R. Pakulak, Rochester Hills, MI (US); Gerald J. Gomes, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/101,734

(22) Filed: Dec. 10, 2013

(65) Prior Publication Data

US 2015/0158411 A1    Jun. 11, 2015

(51) Int. Cl.
  *B60P 7/08*    (2006.01)
(52) U.S. Cl.
  CPC ..................... *B60P 7/0807* (2013.01)
(58) Field of Classification Search
  CPC  B29C 66/30341; B29C 66/45; B29C 66/721; B29C 66/742; B29C 70/088; B29C 70/44; B29C 70/48; B29C 70/86
  USPC .......... 410/143, 129, 130, 132–142; 224/42.33, 42.34; 296/37.6
  See application file for complete search history.

(56) References Cited

U.S. PATENT DOCUMENTS

| | | | |
|---|---|---|---|
| 3,554,416 A * | 1/1971 | Bott | 224/321 |
| 4,191,109 A * | 3/1980 | Wickenberg | 410/149 |
| 6,854,400 B2 * | 2/2005 | Sullivan | 105/372 |
| 7,878,743 B2 * | 2/2011 | Aftanas | 410/150 |
| 8,016,525 B2 * | 9/2011 | Comeau | 410/49 |
| 2008/0101885 A1 * | 5/2008 | Kmita | 410/130 |

* cited by examiner

*Primary Examiner* — Glenn Dayoan
*Assistant Examiner* — Sunsurraye Westbrook
(74) *Attorney, Agent, or Firm* — Quinn Law Group, PLLC

(57) ABSTRACT

A coupling assembly can couple a beam to a loop of a tie-down assembly coupled to an inner sidewall of a pickup bed. The beam defines a channel, and the loop defines an aperture. The coupling assembly includes a coupling plate including a first plate body, a second plate body coupled to the first plate body, a first protrusion extending from the first plate body, a second protrusion extending from the first protrusion, a fastener, and a knob. The first protrusion is configured to be disposed through the aperture of the loop, and the second protrusion is configured to be disposed in the channel of the beam. The fastener includes a head and a threaded shaft coupled to the head. The head is configured to be disposed in the channel, and the threaded shaft extends through the second plate body. The knob is coupled to the threaded shaft.

20 Claims, 4 Drawing Sheets

COUPLING ASSEMBLY

TECHNICAL FIELD

The present disclosure relates to a coupling assembly for a pickup bed.

BACKGROUND

Pickup trucks typically include a pickup bed capable of holding cargo. Some pickup beds also include at least one tie-down assembly for holding objects. In particular, straps or ropes can be tied to the tie-down assembly to restrain objects in the pickup bed. In addition, a beam may be coupled to the pickup bed to organize and separate cargo in the pickup bed. The beam can also support a load and may be attached to a cargo divider. However, the beam should be secured to the pickup bed. It is thus useful to develop a coupling assembly capable of coupling the beam to the tie-down assembly of a pickup bed.

SUMMARY

The present disclosure relates to a coupling assembly capable of coupling a beam to a tie-down assembly coupled to a pickup bed. In an embodiment, the coupling assembly can couple a beam to a loop of a tie-down assembly coupled to a pickup bed. The beam defines a channel, and the loop defines an aperture. The coupling assembly includes a coupling plate including a first plate body, a second plate body coupled to the first plate body, a first protrusion extending from the first plate body, a second protrusion extending from the first protrusion, a fastener, and a knob. The first protrusion is configured to be disposed through the aperture of the loop, and the second protrusion is configured to be disposed in the channel of the beam. The fastener includes a head and a threaded shaft coupled to the head. The head is configured to be disposed in the channel, and the threaded shaft extends through the second plate body. The knob is coupled to the threaded shaft.

The present disclosure also relates to vehicles. In an embodiment, the vehicle includes a pickup bed having a first inner sidewall and a second inner sidewall opposite the first inner sidewall. The vehicle further includes a beam disposed between the first and second inner sidewalls. The beam defines a channel. The vehicle further includes a loop operatively coupled to the first sidewall. The loop defines an aperture. The vehicle further includes a coupling plate interconnecting the loop and the beam. The coupling plate includes a plate body, a first protrusion extending from the plate body, and a second protrusion extending from the first protrusion. The first protrusion extends through the aperture. The second protrusion is at least partially disposed in the channel.

The above features and advantages and other features and advantages of the present invention are readily apparent from the following detailed description of the best modes for carrying out the invention when taken in connection with the accompanying drawings.

DETAILED DESCRIPTION

Figure 1:
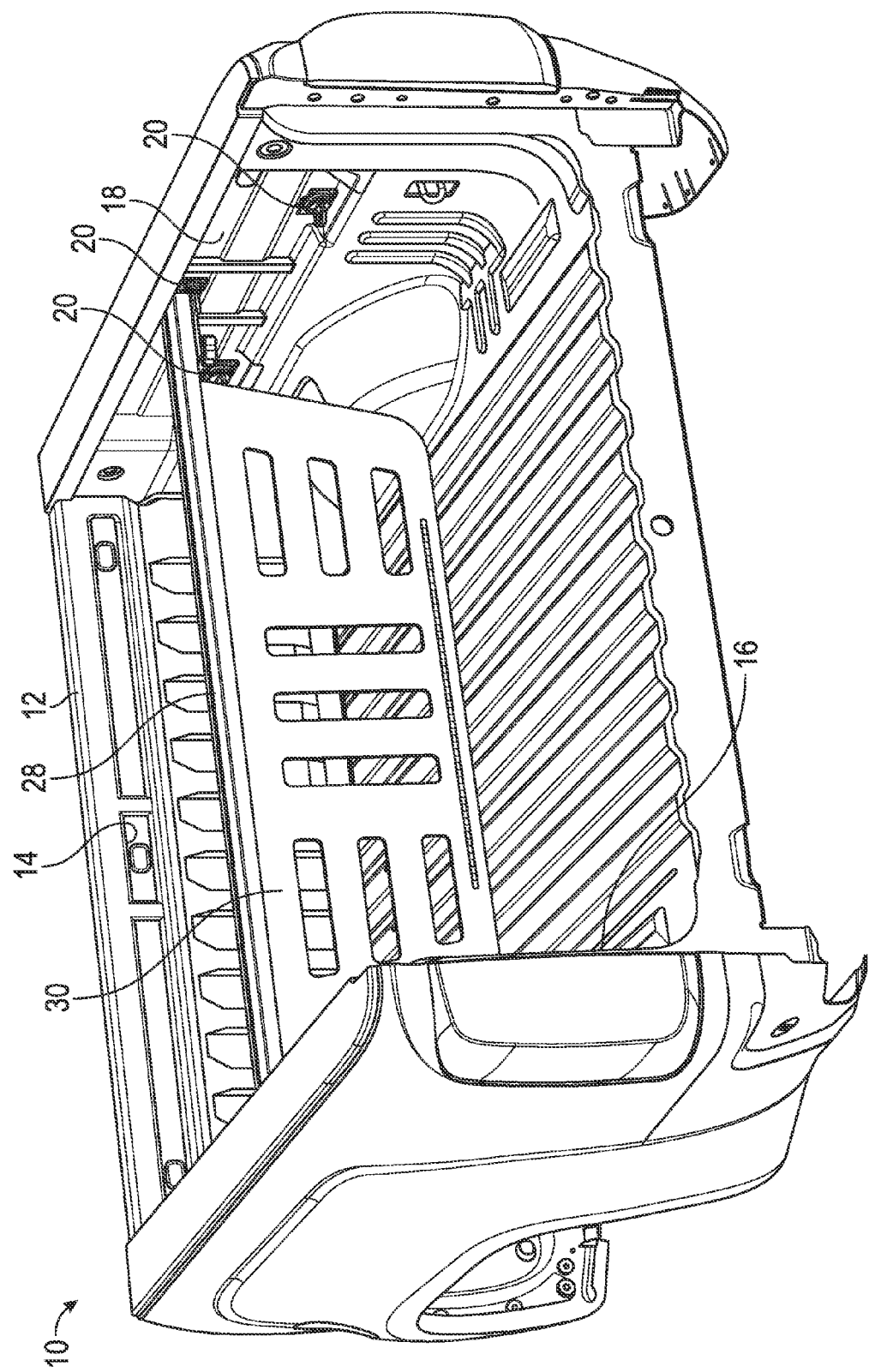
FIG. 1 is a schematic, perspective view of a vehicle including a pickup bed, a cargo divider, and a beam coupled to the pickup bed and the cargo divider.
Figure 2:
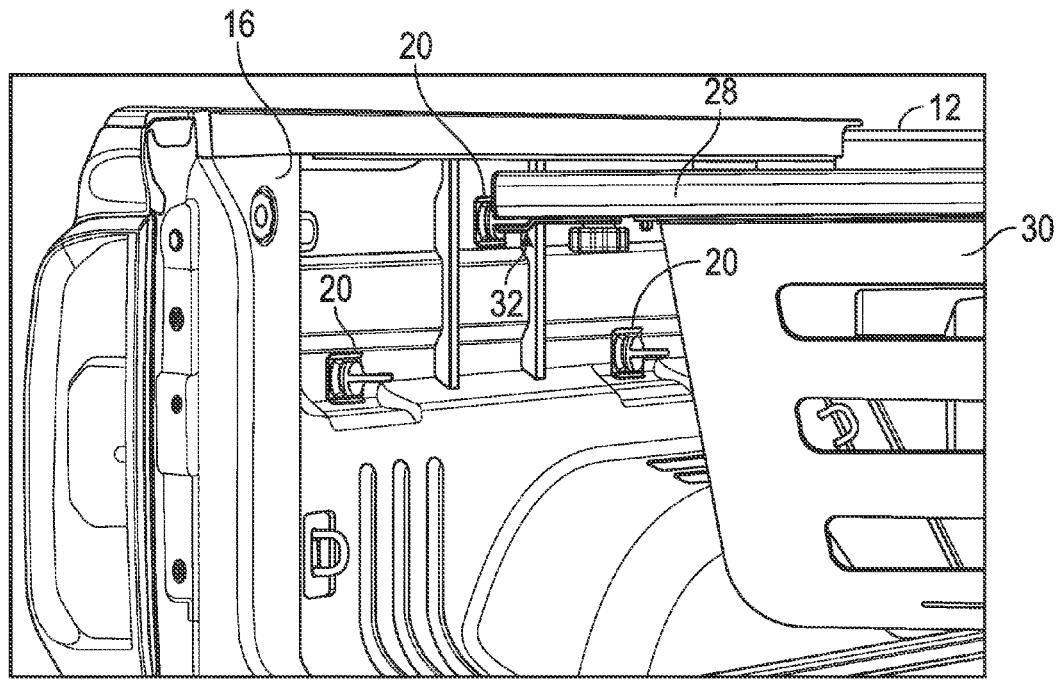
FIG. 2 is a schematic, enlarged, perspective view of the vehicle shown in FIG. 1, depicting the pickup bed, the cargo divider, the beam, a tie-down assembly, and a coupling assembly connecting the beam to the pickup bed.

Referring to the drawings in which like elements are identified with identical numerals throughout, FIGS. 1 and 2 schematically illustrate a vehicle 10 including a pickup bed 12. The pickup bed 12 defines a cargo compartment 14 and includes first and second inner sidewalls 16, 18. In addition to the pickup bed 12, the vehicle 10 may include at least one tie-down assembly 20 for facilitating attachment of other objects to the pickup bed 12. In the depicted embodiment, the vehicle 10 includes a plurality of tie-down assemblies 20 coupled to the first and second inner sidewalls 16, 18 of the pickup bed 12.

The vehicle 10 further includes at least one beam 28 coupled to at least one tie-down assembly 20. In the depicted embodiment, the beam 28 extends from the first inner sidewall 16 to the second inner sidewall 18 and is coupled to one tie-down assembly 20 attached to the first inner sidewall 16 and another tie-down assembly 20 attached to the second inner sidewall 18. The beam 28 can help separate and organize cargo in the pickup bed 12. The vehicle 10 may additionally include a cargo divider 30 operatively coupled to the beam 28. The cargo divider 30 is optional and can be used to separate cargo in the pickup bed 12.

Figure 3:
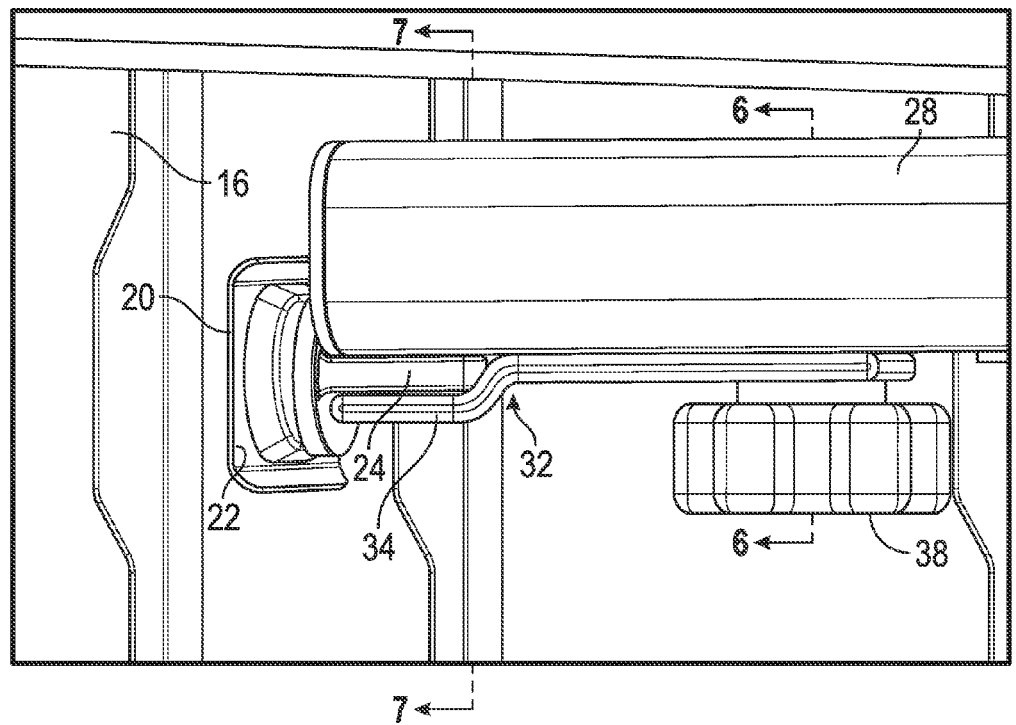
FIG. 3 is a schematic, enlarged, perspective view of the vehicle shown in FIG. 1, depicting the tie-down assembly coupled to the pickup bed, the beam, and the coupling assembly connecting the beam to the tie-down assembly.
Figure 4:
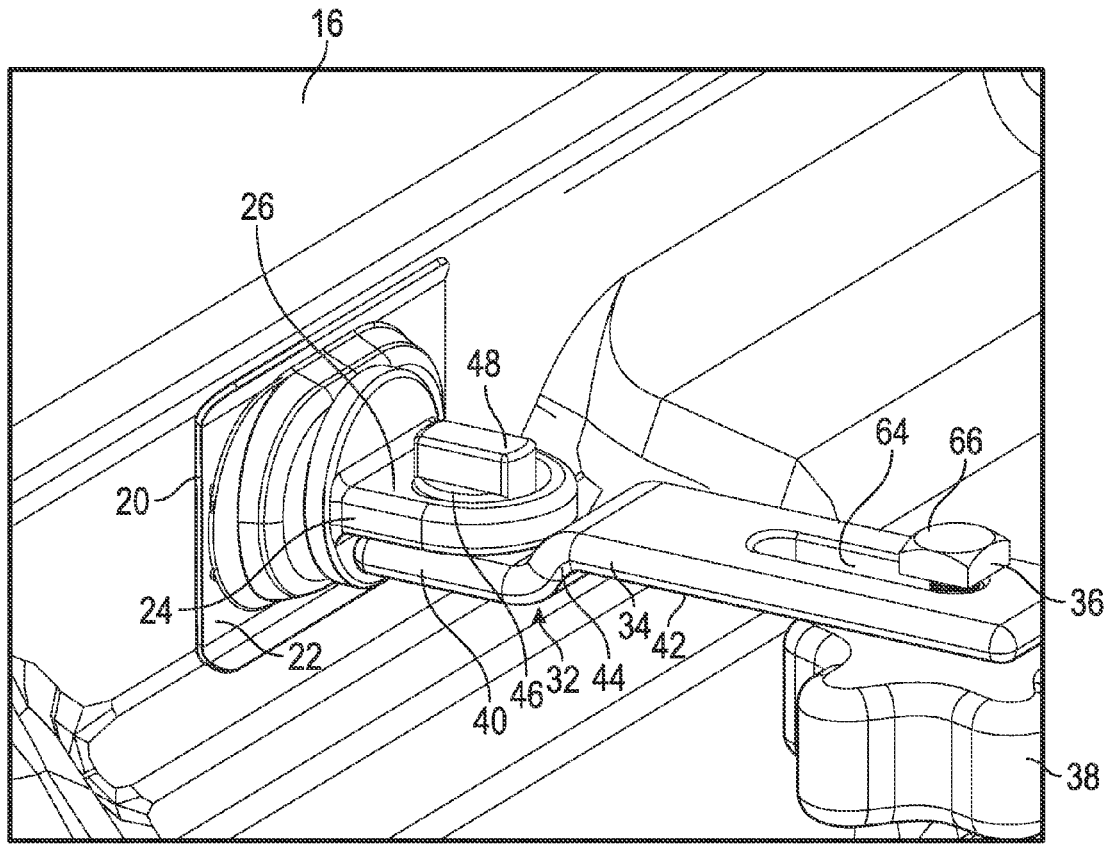
FIG. 4 is a schematic, enlarged, perspective view of the vehicle shown in FIG. 1, depicting the tie-down assembly coupled to the pickup bed, the coupling assembly connecting the beam to the tie-down assembly, without the beam.
Figure 5:
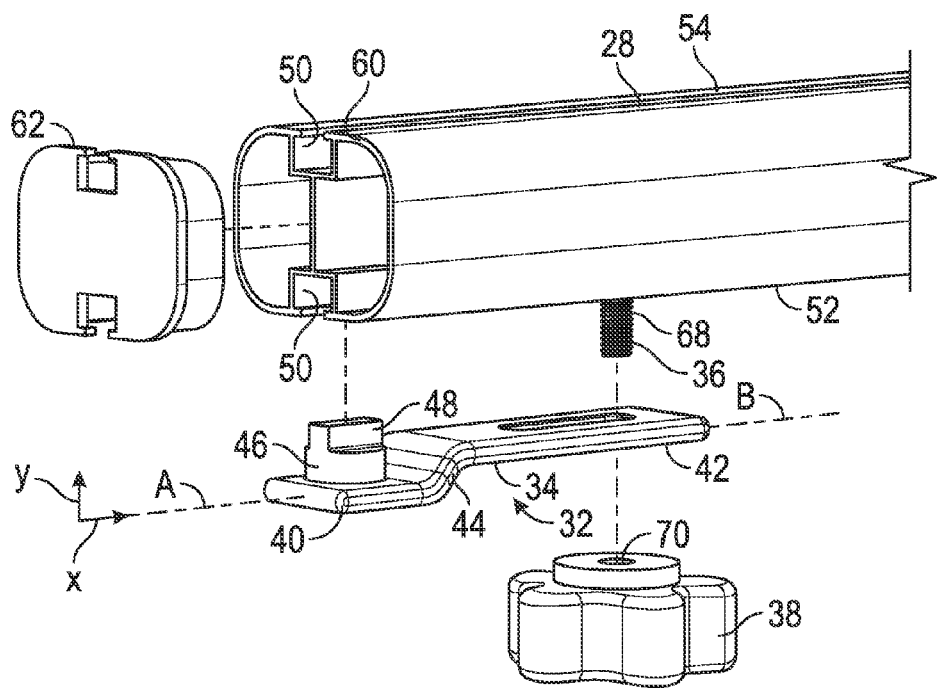
FIG. 5 is a schematic, perspective, exploded view of the coupling assembly and a portion of the beam shown in FIG. 3.
Figure 6:
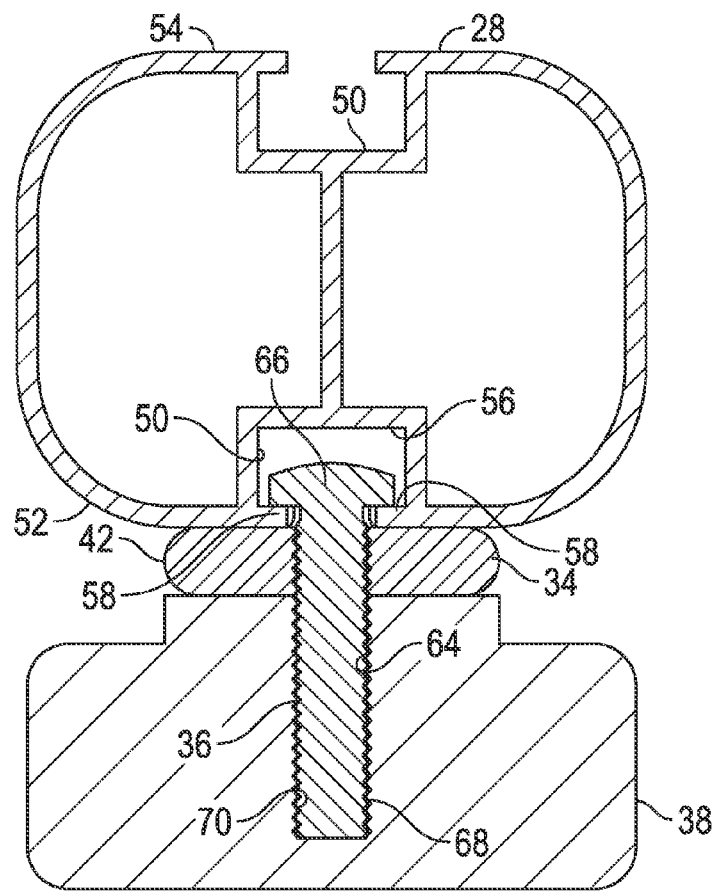
FIG. 6 is schematic, cross-sectional view of the coupling assembly and the beam shown in FIG. 3, taken along section line 6-6 of FIG. 3.
Figure 7:
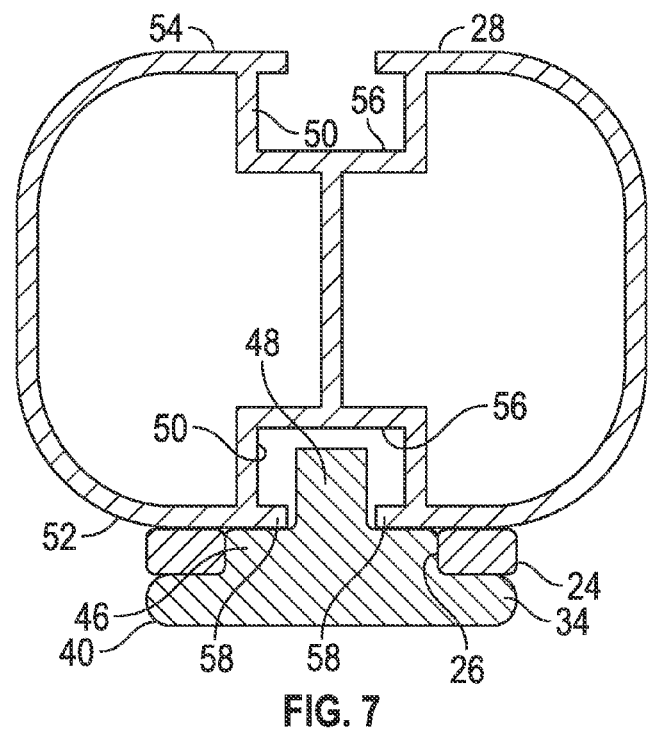
FIG. 7 is a schematic, cross-sectional view of the coupling assembly and the beam shown in FIG. 3, taken along section line 7-7 of FIG. 3.

With reference to FIGS. 3 and 4, each tie-down assembly 20 includes a tie-down plate 22 attached to the first or second inner sidewall 16, 18 and a loop 24 coupled to the tie-down plate 22. Each loop 24 defines an aperture 26 (FIGS. 4 and 7). The aperture 24 (FIGS. 4 and 7) may have a substantially circular shape.

The vehicle 10 may further include a coupling assembly 32 for coupling the beam 28 to one tie-down assembly 20. The coupling assembly 32 may also be referred to as a latching mechanism and generally includes a coupling plate 34, a fastener 36, and a knob 38. As discussed in detail below, the coupling plate 34 can operatively couple the beam 28 to the tie-down assembly 20, and the fastener 36 and knob 38 can jointly couple the beam 28 to the coupling plate 34.

With reference to FIGS. 4-7, the coupling plate 34 includes a first plate body 40, a second plate body 42, and an elbow 44 interconnecting the first and second plate bodies 40, 42. The first plate body 40, the second plate body 42, and the elbow 44 collectively form a monolithic or unitary structure (one-piece structure). Moreover, the first and second plate bodies 42, 44 are both substantially planar. In the depicted embodiment, the first plate body 40 extends along a first axis A, and the second plate body 42 extends along a second axis B. The first and second axes A, B are substantially parallel to each other, but the second axis B is spaced apart from the first axis along a first direction Y. Accordingly, the second plate body 42 is spaced apart from the first plate body 40 along the first direction Y. The second plate body 42 is also spaced apart from the first plate body 40 along a second direction X. The second direction X is substantially perpendicular to the first direction Y. The coupling plate 34 further defines a slot 64 extending through the second plate body 42. The slot 64 is configured, shaped, and sized to receive at least portion of the fastener 36 as described in detail below. The first plate body 40 may also be referred to as a plate body.

Aside from the first and second plate bodies 40, 42, the coupling plate 34 includes a first protrusion 46 extending from the first plate body 40 along the second direction Y. The first protrusion 46 may be substantially cylindrical and is configured, shaped, and sized to be received in the aperture 26 of the loop 24 (FIG. 7). When the first protrusion 46 is at least partially disposed in the aperture 26 of the loop 24 (FIG. 7), the coupling plate 34 can latch onto the tie-down assembly 20.

The coupling plate 34 additionally includes a second protrusion 48 extending from the first protrusion 46 in the second direction Y. The second protrusion 48 may have a substantially cuboid shape and is configured, shaped, and sized to be received in a channel 50 defined by the beam 28. The first protrusion 46 is larger than the second protrusion 48. Specifically, the first protrusion 46 does not fit in the channel 50.

The beam 28 defines at least one channel 50 extending along the first direction X. In the depicted embodiment, the beam 28 has two channels 50. One channel 50 is disposed along a first or bottom surface 52 of the beam 28, and another channel 50 extending along the second or top surface 54 of the beam 28. Each channel 50 is at least partially defined by an inner surface 56 of the beam 28. The beam 28 also includes abutting walls 58 partially defining the channels 50. As discussed in detail below, the fastener 36 can engage the abutting walls 58, thereby allowing the fastener 36 to be coupled to the beam 28. The beam 28 defines an edge 60 and includes an end cap 62 covering the edge 60.

The coupling assembly 32 additionally includes the fastener 36 and knob 38 configured to be coupled to the fastener 36. The fastener 36 may be a male fastener, such as a bolt. As a non-limiting example, the fastener 36 may include a head 66 and a threaded shaft 68 coupled to the head 66. The head 66 is configured, shaped, and sized to fit in at least one of the channels 50 of the beam 28, such that the head 66 rests or abuts the abutting walls 58 of the beam 28. Thus, when the head 66 is disposed in one of the channels 50, the head 66 contacts the abutting walls 58, and the abutting walls 58 prevent the head 66 from exiting the channel 50.

The threaded shaft 68 is coupled to the head 66 and is configured, shaped, and sized to be received in the slot 64 of the coupling plate 34 and in a hole 70 (FIGS. 5 and 6) of the knob 38. The hole 70 may be threaded and may therefore be configured to threadedly engage the threaded shaft 68 of the fastener 36. The hole 70 may also be referred to as a threaded hole. The threaded shaft 68 can extend through the slot 64 and into the hole 70 in order to couple the knob 38 to the coupling plate 34 and the beam 28. The knob 38 can be tightly coupled to the fastener 36 in order to secure the coupling plate 34 to the beam 28. In particular, when the threaded shaft 68 is at least partially disposed in the hole 70, the knob 38 can be turned about the threaded shaft 68 in order to tighten the knob 38 to the coupling plate 34.

The present disclosure also relates to a method of coupling the beam 28 to at least one tie-down assembly 20 using the coupling assembly 32. In an exemplary method, the head 66 of the fastener 36 is placed in one of the channels 50 of the beam 28, and the threaded shaft 68 is inserted through the slot 64 of the coupling plate 34. Next, the first and second protrusions 46, 48 are inserted through the aperture 26 of the loop 24 of the tie-down assembly 20. The first protrusion 46 is advanced through the aperture 26 of the loop 24 until the second protrusion 48 is at least partially disposed in the same channel 50 in which the head 66 of the fastener 36 is disposed. To place the second protrusion 48 in the channel 50, at least a portion of the beam 28 should be positioned on top of the loop 24. After the second protrusion 48 is at least partially disposed in the channel 50, the knob 38 is advanced toward the fastener 36 in order to place the threaded shaft 68 in the hole 70 of the knob 38. Once at least a portion of the threaded shaft 68 is disposed in the hole 70, knob 38 can be turned in order tighten the knob 38 to the coupling plate 34 and the beam 28 in order to secure the beam 28 to the tie-down assembly 20.

While the best modes for carrying out the invention have been described in detail, those familiar with the art to which this invention relates will recognize various alternative designs and embodiments for practicing the invention within the scope of the appended claims.

The invention claimed is:

1. A coupling assembly for coupling a beam to a loop coupled to a pickup bed, the beam defining a channel, the loop defining an aperture, the coupling assembly comprising:
   a coupling plate including a first plate body, a second plate body coupled to the first plate body, a first protrusion extending from the first plate body, and a second protrusion extending from the first protrusion, wherein the first protrusion is configured to be disposed through the aperture of the loop, and the second protrusion is configured to be disposed in the channel of the beam;
   a fastener including a head and a threaded shaft coupled to the head, wherein the head is configured to be disposed in the channel, and the threaded shaft extends through the second plate body; and
   a knob coupled to the threaded shaft.

2. The coupling assembly of claim 1, wherein the coupling plate includes an elbow interconnecting the first and second plate bodies.

3. The coupling assembly of claim 1, wherein the first plate body, the second plate body, and the elbow collectively form a unitary structure.

4. The coupling assembly of claim 2, wherein the coupling plate defines a slot extending through the second plate body, and the slot is configured to partially receive the threaded shaft.

5. The coupling assembly of claim 4, wherein the first plate body is spaced apart from the second plate body along a first direction.

6. The coupling assembly of claim 5, wherein the first protrusion extends from the first plate body along the first direction.

7. The coupling assembly of claim 6, wherein the second protrusion extends from the first protrusion along the first direction.

8. The coupling assembly of claim 7, wherein the second plate body is spaced apart from the first plate body along a second direction, and the second direction is perpendicular to the first direction.

9. The coupling assembly of claim 1, wherein the aperture is cylindrical, and the first protrusion is cylindrical.

10. The coupling assembly of claim 1, wherein the knob defines a threaded hole configured to threadedly engage the threaded shaft.

11. A vehicle, comprising:
    a pickup bed including a first inner sidewall and a second inner sidewall opposite the first inner sidewall;

a beam disposed between the first and second inner sidewalls, wherein the beam defines a channel;

a loop operatively coupled to the first sidewall, wherein the loop defines an aperture;

a coupling plate interconnecting the loop and the beam, wherein the coupling plate includes a plate body, a first protrusion extending from the plate body, and a second protrusion extending from the first protrusion; and wherein the first protrusion extends through the aperture, and the second protrusion is at least partially disposed in the channel.

12. The vehicle of claim 11, further comprising a knob and a fastener coupled to the knob, wherein the fastener includes a head disposed in the channel and a threaded shaft attached to the head, wherein the knob is coupled to the threaded shaft.

13. The vehicle of claim 12, wherein the knob defines a threaded hole configured to receive the threaded shaft.

14. The vehicle of claim 12, wherein the plate body is a first plate body, the coupling plate includes a second plate body, the coupling plate defines a slot extending through the second plate body, and the slot partially receives the threaded shaft.

15. The vehicle of claim 12, wherein the coupling plate further includes an elbow interconnecting the first and second plate bodies.

16. The vehicle of claim 14, wherein the first plate body is spaced apart from the second plate body along a first direction.

17. The vehicle of claim 16, wherein the first protrusion extends from the first plate body along the first direction.

18. The vehicle of claim 17, wherein the second protrusion extends from the first protrusion along the first direction.

19. The vehicle of claim 17, wherein the second plate body is spaced apart from the first plate body along a second direction, and the second direction is perpendicular to the first direction.

20. The vehicle of claim 11, wherein the aperture is cylindrical, and the first protrusion is cylindrical.

\* \* \* \* \*